(12) United States Patent
deLassus

(10) Patent No.: US 6,685,122 B1
(45) Date of Patent: Feb. 3, 2004

(54) TAPE DRIVE LEADER CONNECTION SENSING ASSEMBLY

(75) Inventor: John F. deLassus, Louisville, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 10/214,273

(22) Filed: Aug. 6, 2002

(51) Int. Cl.⁷ ............................................... G11B 15/66

(52) U.S. Cl. .................... 242/332.4; 242/332.1; 360/95

(58) Field of Search ................... 242/332.1, 332.4; 360/95

(56) References Cited

U.S. PATENT DOCUMENTS

| | | | |
|---|---|---|---|
| 4,572,460 A | 2/1986 | Hertrich | 352/235 |
| 6,186,430 B1 | 2/2001 | Zweighaft | 242/332 |

*Primary Examiner*—John Q. Nguyen
(74) *Attorney, Agent, or Firm*—Patton Boggs LLP

(57) ABSTRACT

A sensing assembly for use in determining if magnetic tape within a single reel tape cartridge property disconnects from a takeup reel within a tape drive during unloading of the tape cartridge, so that the tape cartridge can be removed from the tape drive without damaging the tape media and rendering the tape drive inoperable. The sensing assembly may be electrical or electomechanical and comprises at least one sensing apparatus for providing feedback on the position of the takeup leader. The position of the takeup leader is used to determine if the tape cartridge leader disconnects from the takeup leader.

7 Claims, 6 Drawing Sheets

TAPE DRIVE LEADER CONNECTION SENSING ASSEMBLY

FIELD OF THE INVENTION

The invention relates to digital tape drive storage devices, and in particular, to a sensing assembly for determining the connection status between magnetic tape within the tape cartridge and a takeup reel within a digital tape drive.

PROBLEM

Digital data is stored on tape drives utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design, which utilizes a supply reel located within the tape cartridge and a takeup reel located within the tape drive. After the tape cartridge is inserted into the tape drive, the magnetic tape must be connected to the takeup reel. Various methods have been employed to make this connection. One such method connects the magnetic tape to the takeup reel via a buckle between a tape cartridge leader and a takeup leader as described in U.S. Pat. No. 4,572,460.

The magnetic tape within the tape cartridge is terminated at one end by the tape cartridge leader, which is a strong flexible plastic strip containing an ovular aperture on its distal end. The takeup leader is a similar strong flexible plastic strip attached at one end to the takeup reel. The other end has a stem and tab designed to buckle with the ovular aperture on the tape cartridge leader. When the tape cartridge is inserted into the tape drive, the takeup leader and tape cartridge leader are positioned to buckle together. This system improved on prior art systems employing a combination of vacuum and air pressure to guide the tape through a path, but still results in connection failures due to wear, misalignment or other causes.

When the tape cartridge is ejected, first the two leaders should become separated or disconnected to allow the tape cartridge to be removed from the tape drive. When the tape cartridge is ejected while the two leaders are still connected, damage can occur to both leaders, rendering the tape drive inoperable and the tape cartridge damaged. In the prior art, disconnect failures were not always detected by the tape drive. Due to the nature of the tape media, once the tape media within the tape drive is damaged, the data previously recorded on the tape media is not recoverable. In addition, because the disconnection mechanism wears out overtime, the problem of disconnection failures is most common in high duty cycle applications, where it causes the most damage. For example, in applications such as library tape drive systems, a broken tape results in an eject failure. The library is then inoperable since one of the tape cartridge leaders failed to disconnect from the takeup leader.

A sensing assembly for use in determining if magnetic tape within the single reel tape cartridge properly connects to the take up reel within the tape drive during loading of the tape cartridge is disclosed by Zweighaft (U.S. Pat. No. 6,186,430). The sensing apparatus disclosed in '430, in conjunction with a processor detects various movements in the tape drive consistent with specific connection statuses, namely, proper connection and connection failure. Detecting movement first of the freely rotating supply reel and then the takeup reel as the supply reel is slightly energizes provides confirmation that the connection exists.

While the apparatus in '430 detects connection status when the tape cartridge is inserted into the tape drive, the apparatus does not detect a failure during disconnection of the takeup leader from the tape cartridge leader when a tape cartridge is ejected from the tape drive. Failure of the takeup leader and the tape cartridge leader to disconnect when the tape cartridge is ejected from the tape drive results in damage to the takeup leader and the tape media within the tape cartridge. Once the tape media within the tape cartridge is damaged, the data previously stored on the tape media can not be recovered.

For these reasons, it is desirable to have a sensing mechanism that detects a failure of the takeup leader to disconnect from a tape cartridge leader and alerts an operator of the disconnection failure.

SOLUTION

The present tape drive sensing assembly overcomes the problems outlined above and advances the art by providing an apparatus and method for testing the disconnection status of the tape cartridge leader from the takeup leader prior to removal of the tape cartridge from the tape drive. A sensing assembly provides a means for notifying an operator when the takeup leader and tape cartridge leader fail to properly disconnect.

The sensing assembly detects the position of the takeup leader following a disconnection operation to determine the successfulness of the unbuckle operation. If the disconnection operation fails to disconnect the tape cartridge leader from the takeup leader, the sensing assembly generates a signal that can be used to inform the operator of the disconnection failure.

DETAILED DESCRIPTION

The misbuckle detector summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
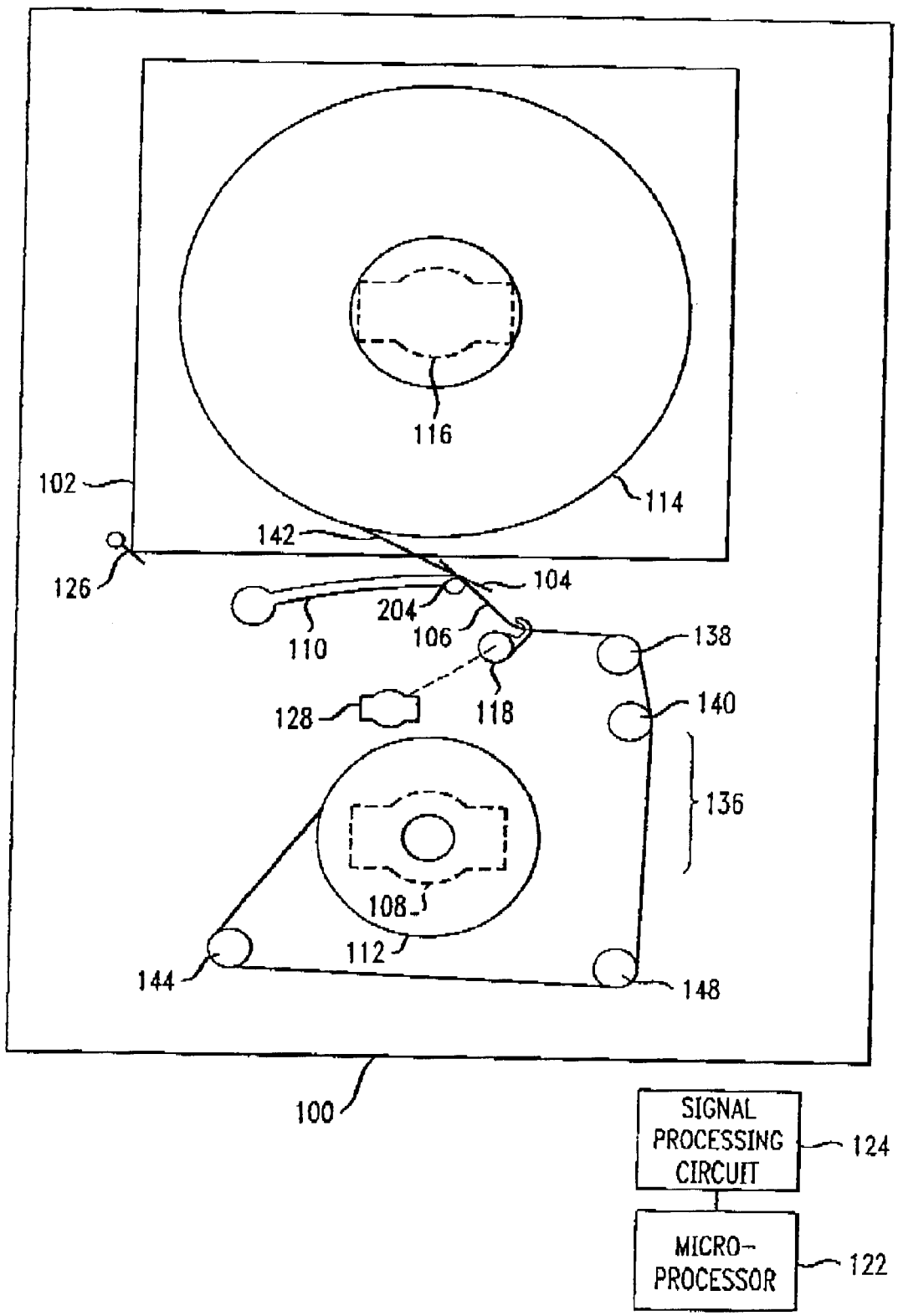
FIG. 1, illustrates a tape drive embodying the sensing assembly of the present tape drive leader connection sensing assembly.

FIG. 1 illustrates tape drive 100 embodying the sensing assembly of the present invention. By way of background, the tape loading operation begins when tape cartridge 102 is inserted into tape drive 100. Tape cartridge 102 houses a length of magnetic tape 142 wound around supply reel 114.

Magnetic tape 142 includes a tape cartridge leader 104 connected to its free end. Takeup reel 112 includes a similar takeup leader 106. Takeup leader 106 connects to the takeup reel 112 and winds around guide rollers 144, 148, 140, and 138 where it hooks on catch 118.

When tape cartridge 102 is fully inserted into tape drive 100, tape cartridge leader 104 is positioned to connect with takeup leader 106. Positioning lever 110 positions tape cartridge leader 104 and takeup leader 106 for connection and disconnection. The loading of tape cartridge 102 engages cartridge present switch 126. Microprocessor 122 in response to a signal from cartridge present switch 126 initiates the connection of takeup leader 106 and tape cartridge leader 104. The connection between takeup leader 106 and tape cartridge leader 104 is in the form of a buckle.

Figure 2:
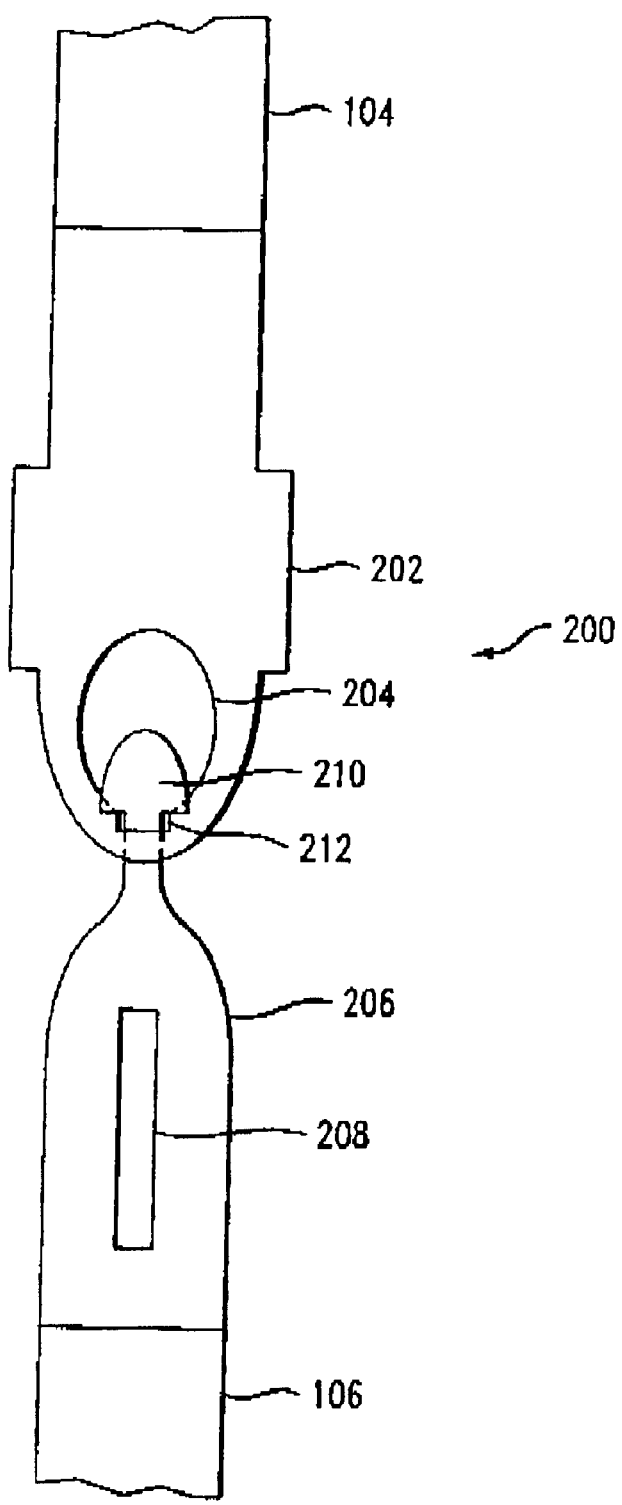
FIG. 2, illustrates a close up view of the connection between the tape cartridge leader and the takeup leader.

FIG. 2 illustrates a close up view of the buckle between tape cartridge leader 104 and takeup leader 106. Tape cartridge leader 104 comprises a first elongated flexible plastic strip 202 containing an ovular aperture 204 defined therein. Takeup leader 106 comprises a similar second elongated flexible plastic strip 206, which contains an integrally formed stem 212 and tab 210 that are proportioned to buckle with ovular aperture 204 as illustrated by FIG. 2. Takeup leader 106 also includes an elongated rectangular slot 208 that is proportioned to hook onto catch 118 of FIG. 1.

Referring back to FIG. 1, in the buckled position, the takeup leader and connected tape cartridge leader are within the tape path aligned with catch 118 and the positioning lever 110. Microprocessor 122 responsive to a signal to eject the tape cartridge rotates catch 118 from loaded position clockwise to the unloaded position thereby catching takeup leader 106 while positioning lever 110 holds takeup leader 106 so that stem 212 is extracted through aperture 204. The leaders are now positioned such that the tape cartridge 102 may be pulled straight out of the tape drive. The tape drive has an eject mechanism that pushes the tape cartridge partially out of the tape drive. This completes the disconnection between the tape cartridge leader 104 and takeup leader 106. If tape cartridge leader 104 and takeup leader 106 do not unbuckle properly due to wear, misalignment or other causes, takeup leader 106 may be pulled past catch 118 and eventually stretch the tape media as the tape cartridge is removed from the tape drive, thereby damaging the tape media. Tape path 136 comprises the path of magnetic tape 142 from its origination on supply reel 114 to its destination on takeup reel 112, including supply motor 116, takeup motor 108, and load motor 128. Tape path 136 also includes positioning lever 110, catch 118, a plurality of guide rollers e.g. 148, 138, 140, and 144, and takeup reel 112.

In the event that a bad disconnection causes the tape cartridge leader to pull the takeup leader 106 as the tape cartridge is removed from the tape drive, the tape media within the tape cartridge may be damaged. The length of tape media within the tape cartridge is drawn taunt as the tape cartridge is moved further from the takeup reel, stretching the tape media and rendering the tape drive and the tape cartridge inoperable. To operate again, the tape drive 100 must be disassembled so that the takeup leader and the tape cartridge leader may be disconnected and the takeup leader 106 can be reconnected to catch 118. The section of the length of tape media within the tape cartridge is damaged and the data recorded thereon may be permanently destroyed.

Leader Connection Status

Figure 3:
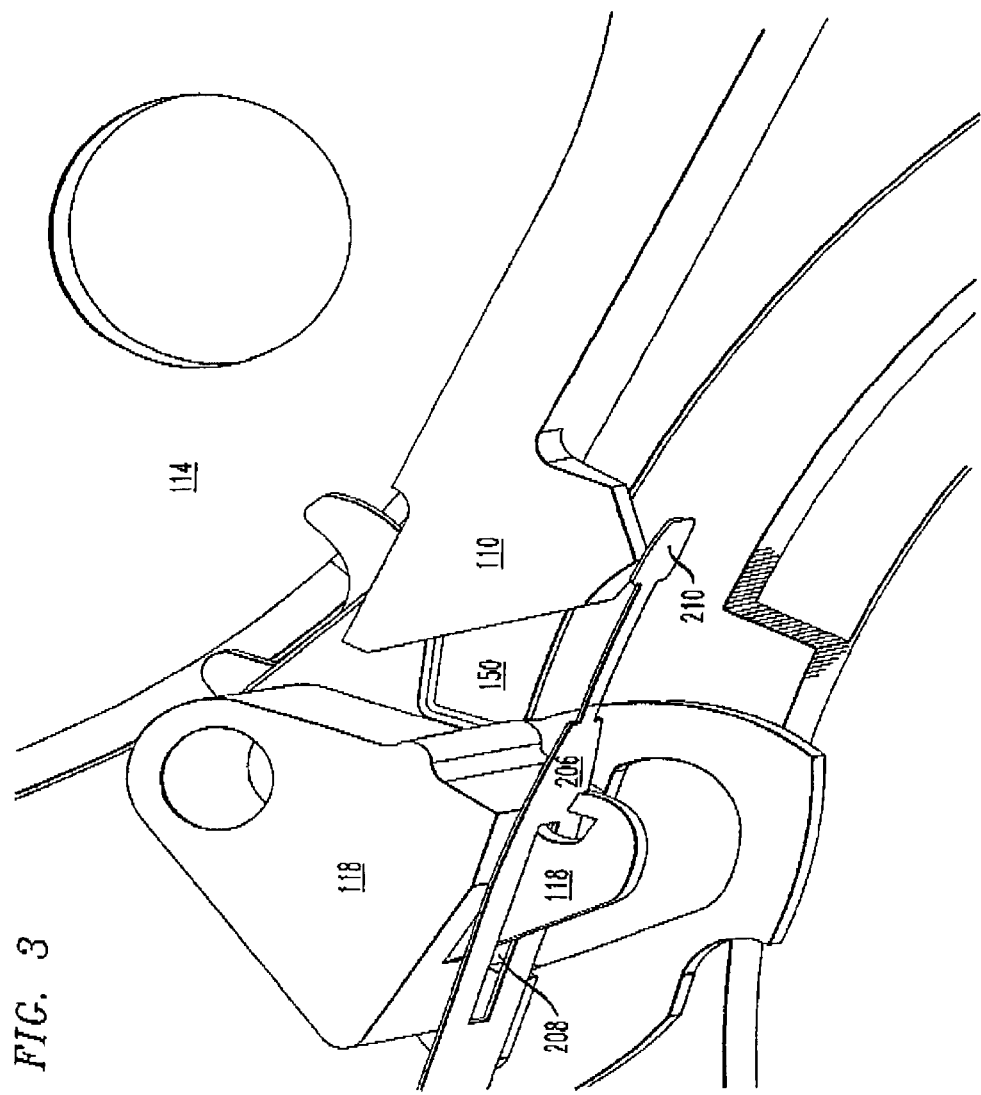
FIG. 3 is a close up perspective view of the takeup leader in a disconnected position.
Figure 4:
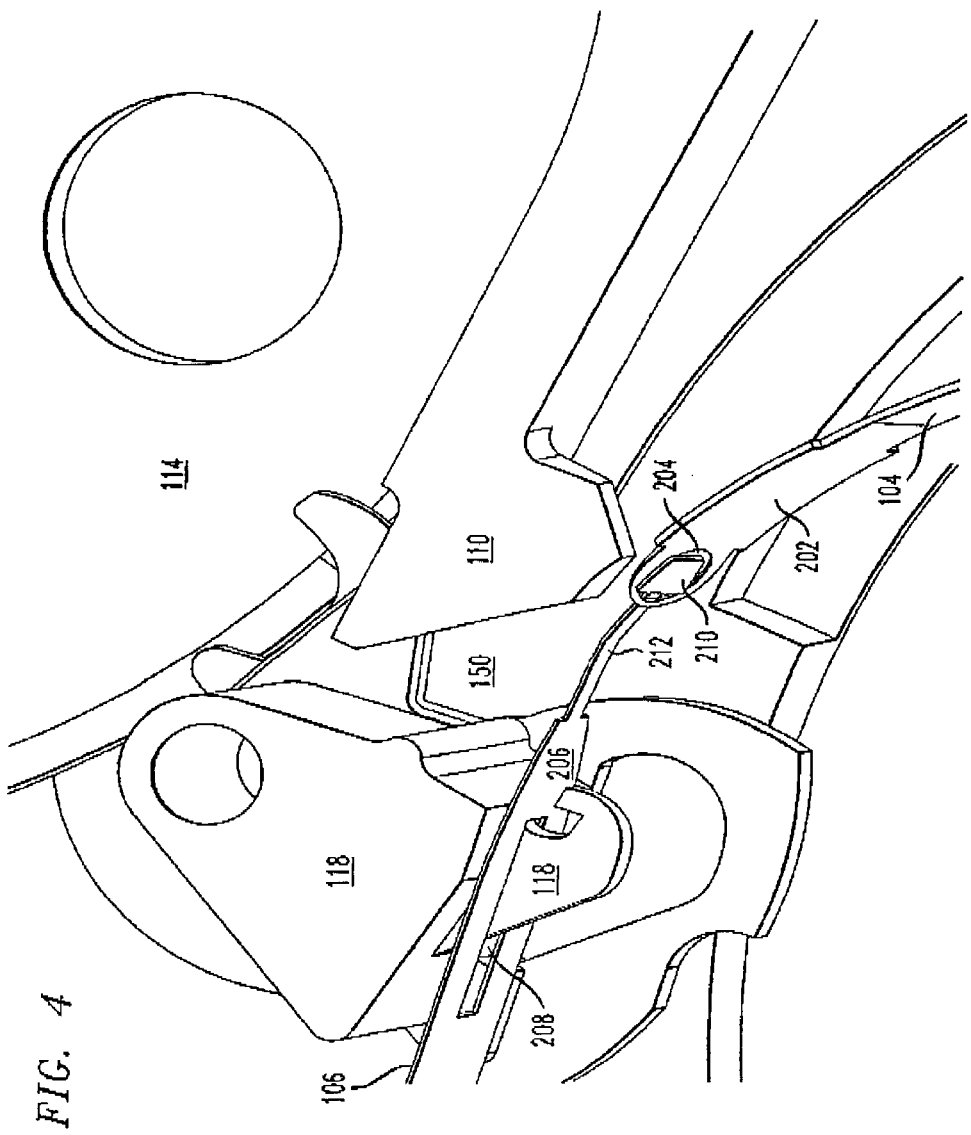
FIG. 4 is a close up perspective view illustrating failure of the tape cartridge leader and the takeup leader to disconnect.
Figure 5:
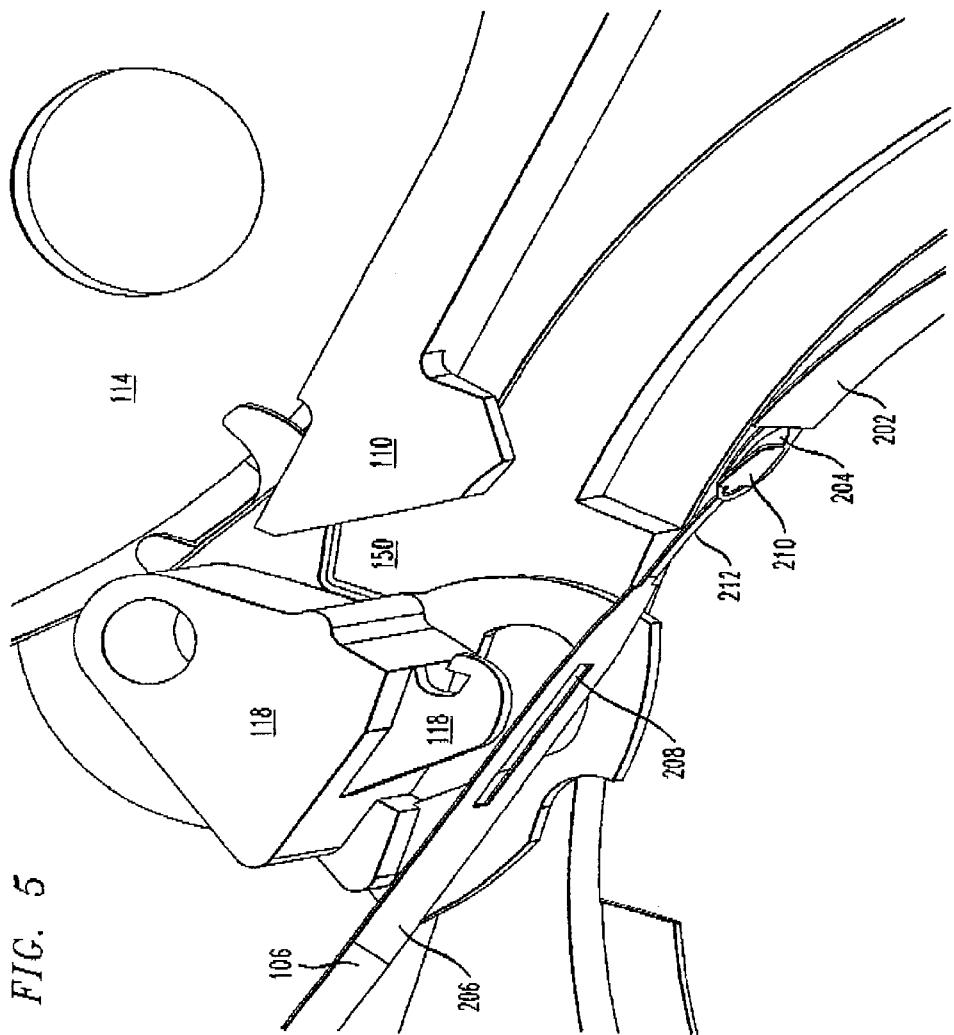
FIG. 5 is another close up perspective view illustrating failure of the tape cartridge leader and the takeup leader to disconnect.

Under normal operating conditions, when the takeup leader is disconnected from the tape cartridge leader, catch 118 is hooked through slot 208 and tab 210 of the takeup leader rests against positioning lever 110 as illustrated in the close up perspective view of FIG. 3. Microprocessor 122 in response to a signal to eject the tape cartridge 102 initiates the disconnection operation to disconnect the takeup leader 106 from the tape cartridge leader 104. When the disconnection fails as illustrated in FIG. 4, the takeup leader 106 remains connected to the tape cartridge leader 104 as the tape cartridge is ejected from the tape drive. The takeup leader may remain hooked to catch 118 as illustrated in FIG. 4 or may be unhooked as illustrated in FIG. 5. In both failed configurations, the takeup leader fails to return to its disconnected position in contact with positioning lever 110.

Therefore, determining the position of the takeup leader following a disconnection operation is indicative of the disconnection status. Once a disconnection fails, the tape cartridge should not be removed from the tape drive. Removal of the tape cartridge from the tape drive will damage the tape media within the tape cartridge destroying the data previously stored on the tape media. Failure of the tape drive to notify the operator of the failed disconnection results in the operator removing the tape cartridge from the tape drive and thereby damaging the tape media. The sensing assembly may be electrical or electromechanical. In an embodiment the sensing assembly comprises a sensing device located near the tape path for monitoring the position of the takeup leader. When the take up leader is connected to the tape cartridge leader, the takeup leader is positioned within the tape path. As previously discussed, when the takeup leader and the tape cartridge leader are disconnected, the takeup leader is in contact with or in close proximity to the positioning lever. Thus, a sensing device located on the positioning lever may be used to sense the position of the lever.

Figure 6:
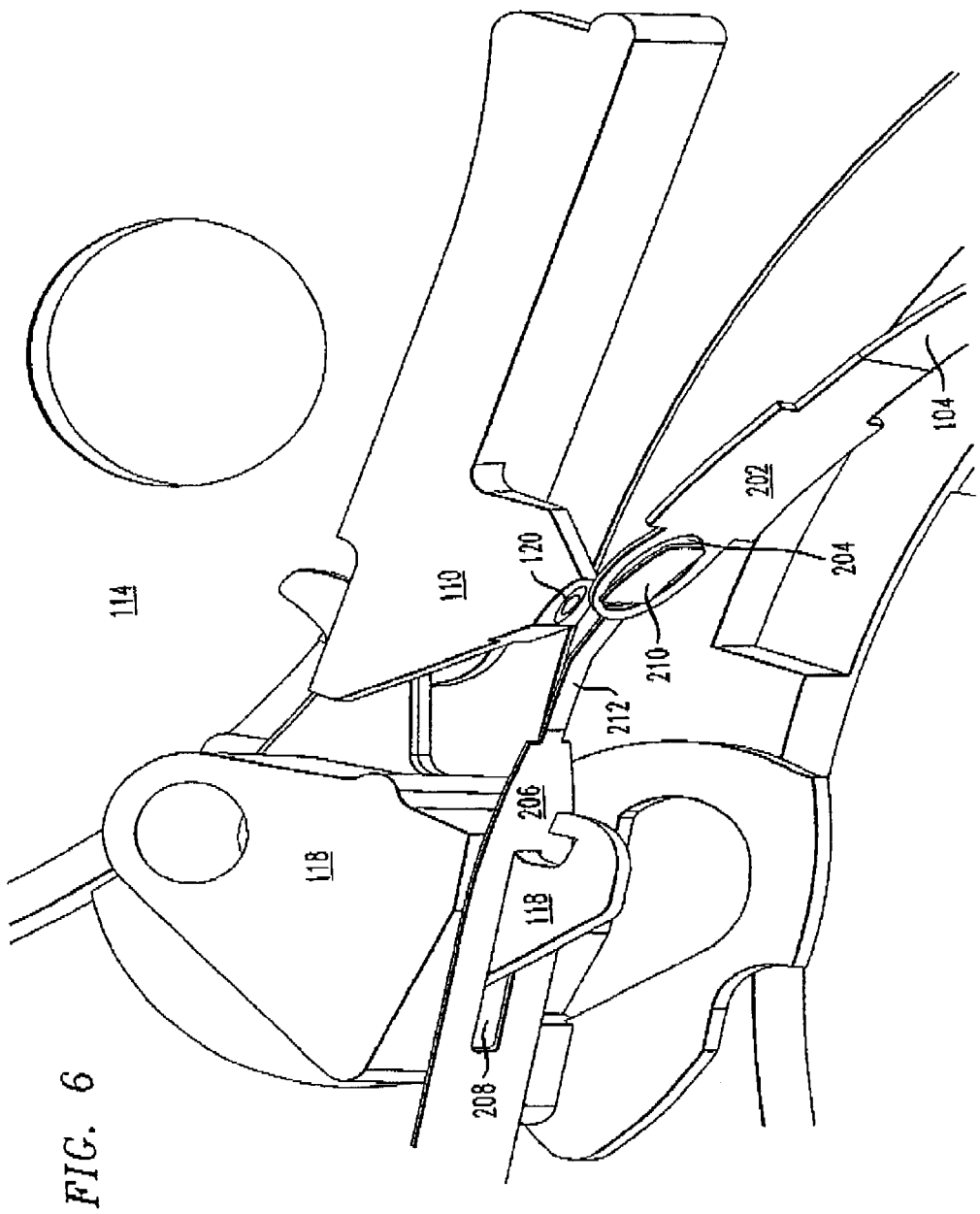
FIG. 6 is a close up perspective view of an embodiment of the present tape drive leader connection sensing assembly.

For example, the sensing device in FIG. 6 is a positioning sensor 120 connected within an area on the positioning lever 110 near where the takeup leader 106 contacts the positioning lever 110 when disconnected. The sensing device may be a light emitting or light detecting device having a corresponding light detecting or light emitting source positioned to complete or break a light path when the takeup leader is disconnected. Following an unbuckle operation, the sensing device detects the position of the takeup leader and provides feedback to a microprocessor in response to the position of the takeup leader within the tape drive. The sensing device may be an alternative sensing device such as a pressure sensitive device for sensing the contact between the takeup leader 106 and the positioning lever 110. Microprocessor 122 provides the signaling required for controlling the operation of tape drive 100. Position sensor 120 may be connected to any location where the position of the takeup leader 106 can be sensed. Microprocessor 122 and signal processing circuit 124 are a conventional circuit and processor configured with software to operate in accord with the various embodiments of the sensing assembly.

Following a proper disconnection, the takeup leader is at rest and in close proximity to the positioning lever 110, as illustrated in FIG. 3, partially blocking the position sensor 120. The signal sent by the position sensor 120 to the microprocessor 122 via signal processing circuit 124 indicates at least a partial blockage of the position sensor 120. In response to the passing status of the disconnection, the microprocessor may indicate via a control panel (not illustrated) on the tape drive that the tape cartridge is ready for removal. Failure of the takeup leader and the tape cartridge leader to disconnect results in the takeup leader retaining connection to the tape cartridge leader and therefore located a distance from the position sensor 120 as illustrated in FIGS. 4 and 5. The microprocessor checks the signals received from position sensor 120 following the disconnection to determine the position of the takeup leader. If the signal received by the microprocessor indicated that the disconnect failed, microprocessor 122 may be programmed to alert operators by providing a visual and/or audio message. Microprocessor 122 may also be programmed for various other responses, including but not limited to performing a pre-programmed number of disconnection attempts before alerting the operator of the disconnection failure.

Thus, the present tape drive leader connection sensing assembly provides a method for determining the position of the takeup leader and notifying the operator of the failed disconnection such as providing an audible sound or visual display to alert the operator of the failed disconnection and thereby prevent the operator from pulling the tape cartridge out of the tape drive and damaging the tape media therein. Use of the present tape drive connection sensing assembly for a tape drive installed in a tape cartridge library, or autoloader, apparatus provides a method for notifying the tape cartridge system and the operator that the takeup leader has failed to disconnect from the tape cartridge leader.

A preferred feature is to provide timely feedback on the disconnection status. As to alternative embodiments, those skilled in the art will appreciate that the present sensing assembly may be utilized to detect numerous variables within tape drive that indicate disconnection status. In addition, the present sensing assembly may be located on either side of the tape path and may be used to detect variables internally or externally to tape path that indicate connection status.

It is apparent that there has been described, a sensing assembly for determining if magnetic tape in a tape cartridge is properly connected to a tape drive, that fully satisfies the objects, aims, and advantages set forth above. While the sensing assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A sensing assembly for use with a tape drive employing a single reel equipped with a takeup leader for interconnecting with a tape cartridge leader connected to a length of tape media located within a tape cartridge, to determine if said tape cartridge leader disconnects from said takeup leader during unloading of said tape cartridge, so that said tape cartridge can be removed from said tape drive without damaging said length of tape media, comprising:

means for disconnecting said takeup leader from said tape cartridge leader prior to removing said tape cartridge from said tape drive; and a sensing means within a tape path to sense a position of said takeup leader following said disconnect, said position being used to determine if said tape cartridge leader disconnects from said takeup leader.

2. The sensing assembly of claim 1 further comprising:

a processing means, responsive to said detected position of said at least one of said takeup leader and said tape cartridge leader, for determining if said tape cartridge leader disconnects from said takeup leader.

3. The sensing assembly of claim 1 wherein said sensing means is a position sensor connected with a position lever with said tape path.

4. A sensing assembly for use with a tape drive employing a single reel equipped with a takeup leader for interconnecting with a tape cartridge leader connected to a tape media located within a tape cartridge, to determine if said tape cartridge leader disconnects from said takeup leader during unloading of said tape cartridge from said tape drive, comprising:

a disconnection apparatus for disconnecting said tape cartridge leader from said takeup leader prior to removing said tape cartridge from said tape drive;

a sensing device within a tape drive tape path for sensing a position of said takeup leader following said disconnect; and a processor responsive to said sensed position of said takeup leader for determining if said tape cartridge leader disconnects from said takeup leader.

5. The sensing assembly of claim 4 wherein said sensing device comprises a position sensor connected with a position lever within said tape path for sensing said position of said takeup leader.

6. A method for determining if a tape cartridge leader connected to a length of tape media within a tape cartridge disconnects from a takeup leader within a tape drive employing a single reel during unloading of said tape cartridge, comprising the step of:

(a) executing a disconnection operation to disconnect said tape cartridge leader from said takeup leader;

(b) sensing a position of said takeup leader following said disconnect operation; and (c) determining a connection status of said tape cartridge leader from said takeup leader.

7. The method of claim 6, further comprising the step of:

alerting an operator of a disconnection failure in response to a determination that the disconnection failed.

\* \* \* \* \*